Nov. 12, 1968  R. GENÄHR ET AL  3,411,010
FIBER-OPTIC CABLE COMPRISING A PLURALITY OF RIBBONS, EACH
HAVING A PLURALITY OF LIGHT CONDUCTIVE FIBERS
Filed Aug. 8, 1966

Rudolf Genähr
Kurt Broide
    INVENTORS.

BY  Karl F. Ross
        Attorney 3,411,010
FIBER-OPTIC CABLE COMPRISING A PLURALITY OF RIBBONS, EACH HAVING A PLURALITY OF LIGHT CONDUCTIVE FIBERS
Rudolf Genähr and Kurt Brolde, Bad Kreuznach, Germany, assignors to Jos. Schneider & Co., Bad Kreuznach, Germany, a corporation of Germany
Filed Aug. 8, 1966, Ser. No. 571,035
Claims priority, application Germany, Sept. 18, 1965, Sch 37,749
6 Claims. (Cl. 250—227)

Our present invention relates to a system for the transmission of luminous radiation and, more particularly, to a fiber-optical cable adapted to be used in such system.

An important field of use for fiber-optical cables is in the transmission of information which can be converted into digital pulses serving to register, for immediate visual reproduction (e.g. by means of a cathode-ray oscilloscope) and/or for storage on a recording medium, the analog of some measured quantity such as, for example, a physical dimension of a chosen object. This is especially useful where the object to be measured is not directly accessible for conventional measurements (e.g. because of intense heat or susceptibility to damage upon contact) so that its dimensions can be determined most conveniently from the shadow it casts or from an image of its own radiant body.

An object of this invention is to provide a cable of light-transmissive fibers adapted to serve as a measuring rule or yardstick for an area of distinct luminous intensity for the purpose set forth above.

Another object of our invention is the provision of an improved system for the storage and/or evaluation of information received from a cable of this character.

In accordance with an important aspect of the present invention, we provide a fiber-optical cable having one of its extremities shaped into a rigid bar along which the exposed ends of its light conductors are spaced according to a predetermined law, preferably uniformly with a convenient linear division of, say, 0.1 mm. In order to insure the necessary mechanical stability, the light conductors have the form of flat ribbons which are stacked together with interposition of relatively stiff and opaque, advantageously metallic foils, these interposed foils being wider than the conductor ribbons so as to have overhanging portions between which another set of narrower but otherwise similar foils, of a thickness equaling that of the ribbons, are disposed to solidify the stack throughout a substantially rectangular cross-sectional area. The ribbons may consist of a resin matrix having a planar array of light-conductive fibers imbedded therein; this arrangement insures that one or more fibers at any division of the measuring bar can be torn or damaged without significantly affecting the output.

The two sets of foils and the interleaved conductor ends, cemented together, form a deformation-resistant assembly beyond which, however, the conductor ribbons are quite flexible so that the cable can be readily bent along most of its length. This is especially advantageous where the incident luminous field is subject to considerable displacement. The fiber ends at the opposite extremity of the cable work into one or more photoelectric transducers, such as a photocell, and—in accordance with a further feature of our invention—may be arrayed along an arc of a circle for consecutive sampling by one or more pick-up elements advantageously themselves constituted by light-conductive fibers.

The invention will be described in greater detail with reference to the accompanying drawing in which.

Figure 1:
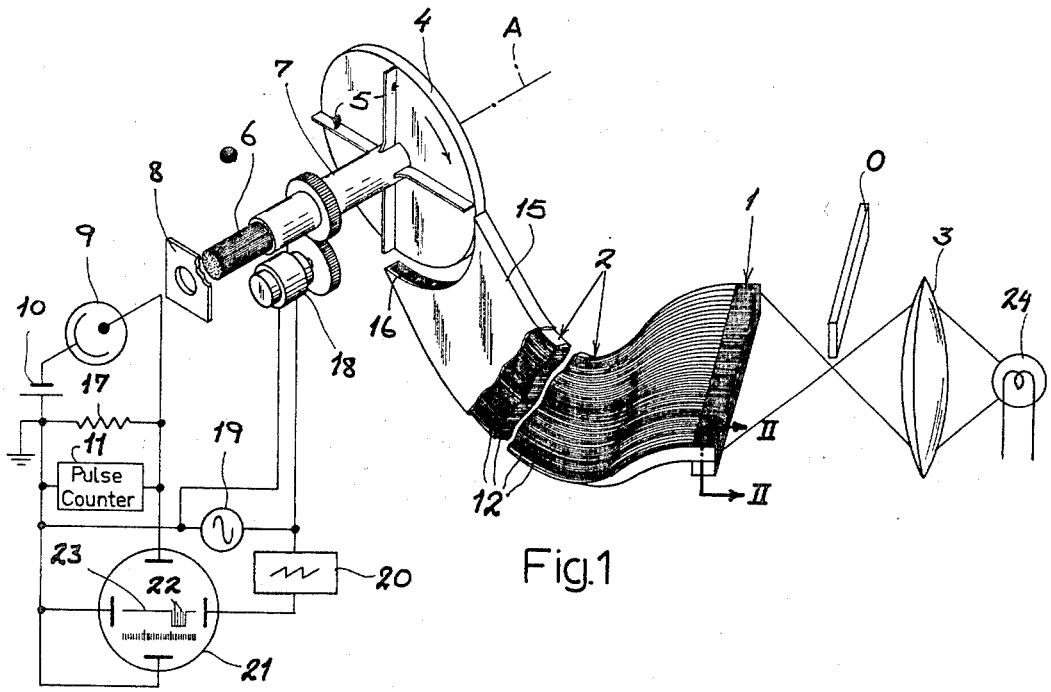
FIG. 1 is a somewhat diagrammatic view of a luminous transmission system incorporating our improved fiber-optical cable.

In FIG. 1 we have shown a fiber-optical cable 2 which terminates in a measuring rule 1 confronting a source of light here shown diagrammatically as a lamp 24 and an objective 3. Interposed between this light source and the cable extremity 1 is an elongated object O whose length is to be measured.

Cable 2 consists of a multiplicity of ribbon-shaped light conductors 12 which are enveloped, over most of their length, by a flexible sheath 15 of rubber or the like. The ends of these conductors remote from element 1 are arcuately cut off at 16 to form a quadrant centered on an axis A about which a disk 4 is rotatable. Disk 4 carries four light-conducting strands 5 which merge into an axial bundle 6 within a tubular shaft 7 supporting the disk. The rear end of cable 6 confronts a photocell 9 energized from a source of current which has been indicated diagrammatically as a battery 10 and which, of course, may also include the usual amplifying equipment. A diaphragm 8 may be inserted between cable 6 and photocell 9.

Connected in the output circuit of photocell 9, in parallel with a resistor 17, is a pulse counter 11 which registers the number of light pulses picked up in rapid succession by the cell 9 as the disk 4 is rotated about its axis A by means of a motor 18 coupled with shaft 7. Motor 18 may be of the synchronous type driven from an alternating-current source 19 which also energizes the horizontal sweep circuit 20 of a monitoring cathode-ray oscilloscope 21, the vertical deflecting electrodes of the oscilloscope being shown connected across the output resistor 17 of the photocell.

In the operation of the system of FIG. 1 the shadow of object O falls on the measuring element 1 so that only a portion thereof is illuminated by the light source 3, 24. The radiation incident upon the illuminated ribbons 12 is converted into a train of discrete pulses as their exposed ends 16 are scanned by the rotating light conductors 5. With the physical arrangement illustrated, the cable 2 is scanned four times in immediate succession during each revolution of disk 4; sweep circuit 20 should, therefore, produce four sawtooth cycles per disk revolution and counter 11 should be similarly reset at every quarter turn of shaft 7. The luminous pulses are reproduced by the oscilloscope 21 in the form of negative spikes 22 and their number varies inversely with the length of the shadow cast by the object O, this length being thus indicated by the line 23 on the oscilloscope screen. The number of pulses registered during each quarter turn by the counter 11, or the complement of that number with reference to the total number of ribbons 12, may also be visually displayed and/or recorded on magnetic tape or some other suitable medium.

If the object O were luminous and imaged directly upon the cable extremity 1 by the lens 3 (with omission of lamp 24), the number of pulses registered by counter 11 and oscilloscope 21 would be directly proportional to the length of the object.

Figure 2:
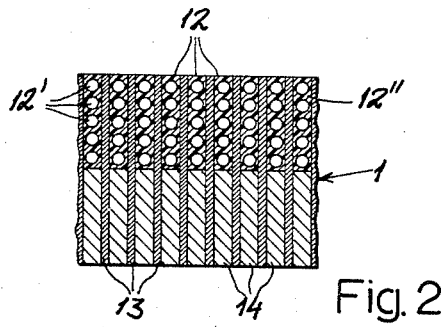
FIG. 2 is a sectional detail view of the cable taken on the line II—II of FIG. 1.

FIG. 2 illustrates in more detail the construction of the measuring bar 1 constituted by the input end of cable 2. The ribbons 12 are uniformly spaced from one another by interposed metal foils 13 of greater width, the overhanging portions of these foils being separated by other, narrower metal foils 14 having the same thickness as the ribbons 12 so that the resulting stack 12–14 has a rectangular profile. Ribbons 12 and foils 13, 14 are bonded together by a suitable cement, the relative stiffness of the foils imparting great rigidity of the bar 1. Each of the ribbons 12 will be seen to comprise a planar array of fibers 12' imbedded in a plastic matrix 12''; a similar composition may be used for the rotating light conductors 5 in FIG. 1.

In a specific instance, which is highly advantageous for the measuring of linear dimensions in metric units, the fibers 12' may have a diameter of about $50\mu$, the entire ribbon 12 being only slightly thicker (e.g. $60-70\mu$), while the combined thickness of a ribbon 12 and an adjacent foil 13 is exactly $100\mu$ corresponding to a division of ten light pulses per millimeter of length.

Figure 3:
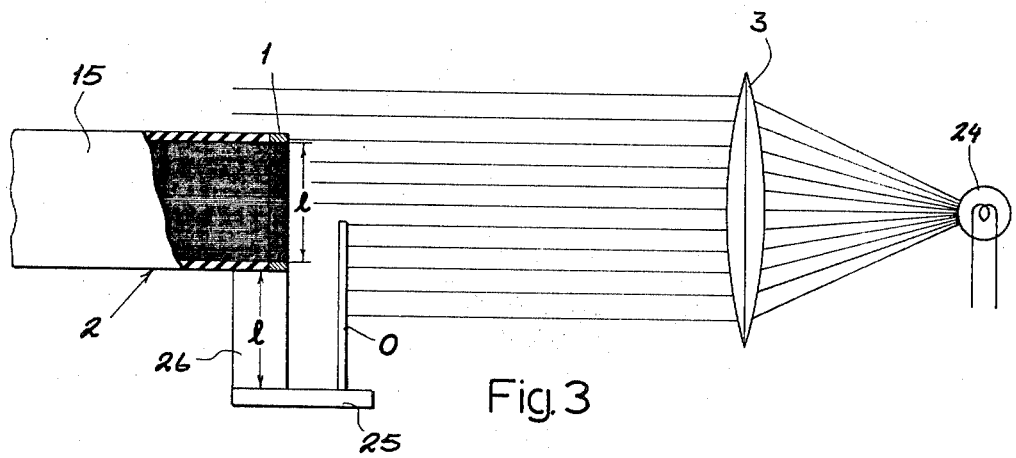
FIG. 3 is a diagrammatic plan view illustrating a slight modification of the arrangement shown in FIG. 1.

The flexibility of our improved cable 2 can be used to special advantage in an arrangement as shown in FIG. 3 wherein the object O has a length greater than that of measuring bar 1. The object O is shown there as resting against a stop 25 while a calibrated spacing block 26, of the same length $l$ as the bar 1, is interposed between this stop and the bar. Naturally, other spacers of length $2l$, $3l$ etc. may be similarly used for even longer objects. The length of the spacer must, of course, be taken into account in evaluating the information from counter 11 or indicator 21.

We claim:

1. A fiber-optical cable for the transmission of luminous radiation, comprising a plurality of light-conductive ribbons each composed of a resinous matrix having a plurality of light-conductive fibers imbedded therein in a planar array, a set of metallic first opaque foils wider than said ribbons interleaved with the ends of the latter and assembled therewith into a stack, and a set of narrower second opaque foils of a thickness equaling that of said ends disposed alongside said ends between over-hanging portions of said first foils whereby said stack is solidified throughout a substantially rectangular cross-sectional area, said ends being exposed to incident light along one face of said stack, the combined thickness of a ribbon and an adjoining first foil being a fraction of a millimeter, said fibers having a diameter equal to substantially half said combined thickness.

2. A cable as defined in claim 1 wherein said second foils are also metallic.

3. A cable as defined in claim 1 wherein said fibers have a diameter of subtsantially $50\mu$, said first foils have a thickness of substantially 30 to $40\mu$ and the combined thickness of a ribbon and an adjoining first foil is 0.1 mm.

4. In a system for the transmission of luminous radiation, a cable as defined in claim 1 in combination with a source of light positioned to illuminate said stack, an object to be measured being interposable between said source and said face of said stack whereby the number of illuminated ribbon ends depends on the extent of overlap between said stack and said object, and photoelectric transducer means operatively juxtaposed with opposite extremities of said ribbons.

5. The combination defined in claim 4 wherein said extremities are disposed along an arc of a circle, said transducer means including pick-up means rotatable in an orbit coaxial with said circle for consecutive confrontation of all said extremities.

6. The combination defined in claim 5 wherein said pick-up means comprises a generally radial fiber-optical element.

No references cited.

ROBERT SEGAL, *Primary Examiner.*